A. C. LINDGREN.
AGRICULTURAL IMPLEMENT.
APPLICATION FILED APR. 18, 1908.
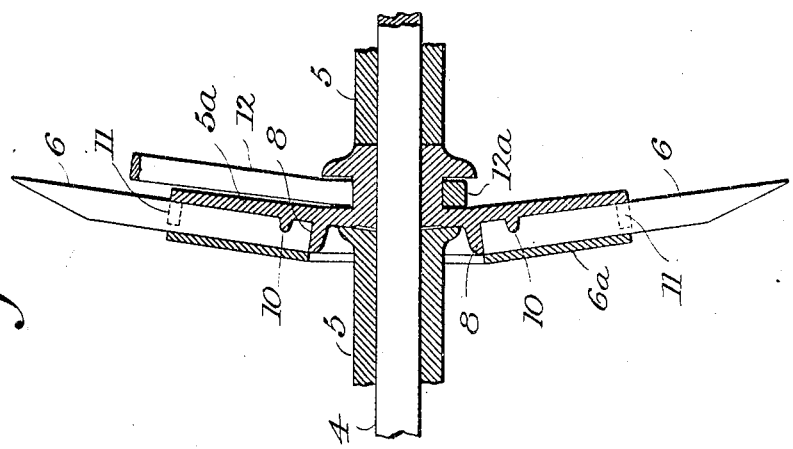
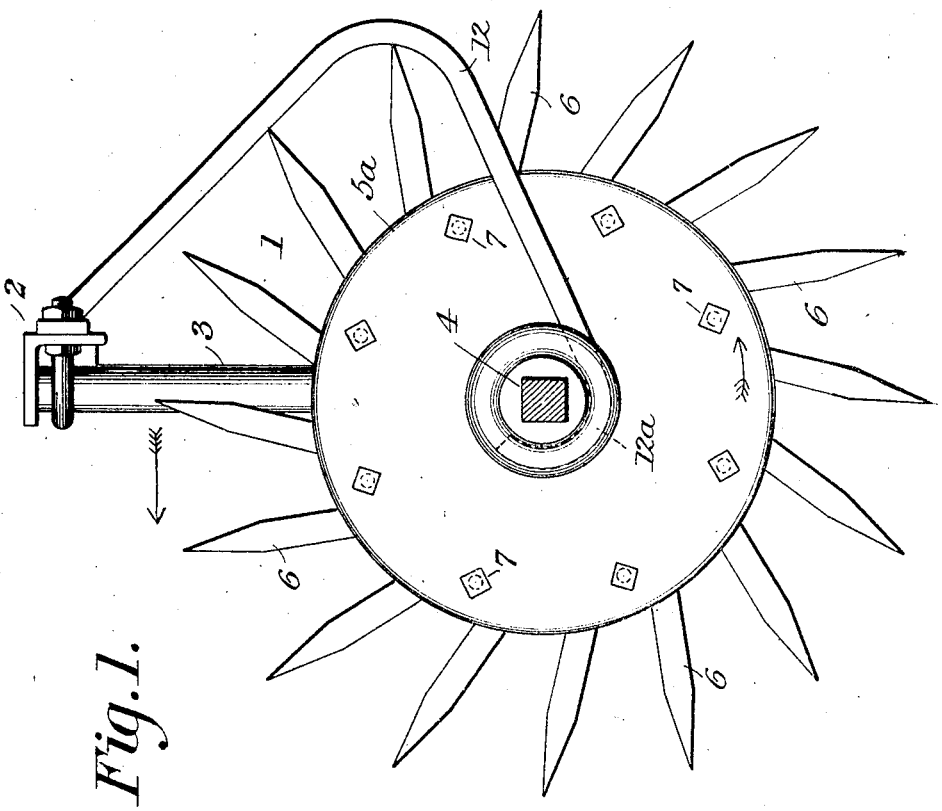

A. C. LINDGREN.
AGRICULTURAL IMPLEMENT.
APPLICATION FILED APR. 18, 1908.
925,926.
Patented June 22, 1909.
2 SHEETS—SHEET 2.
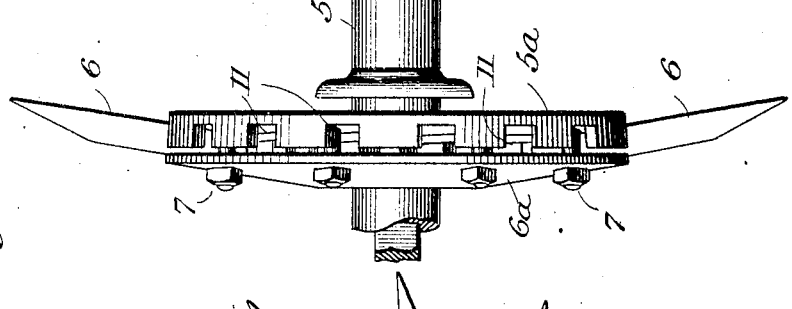
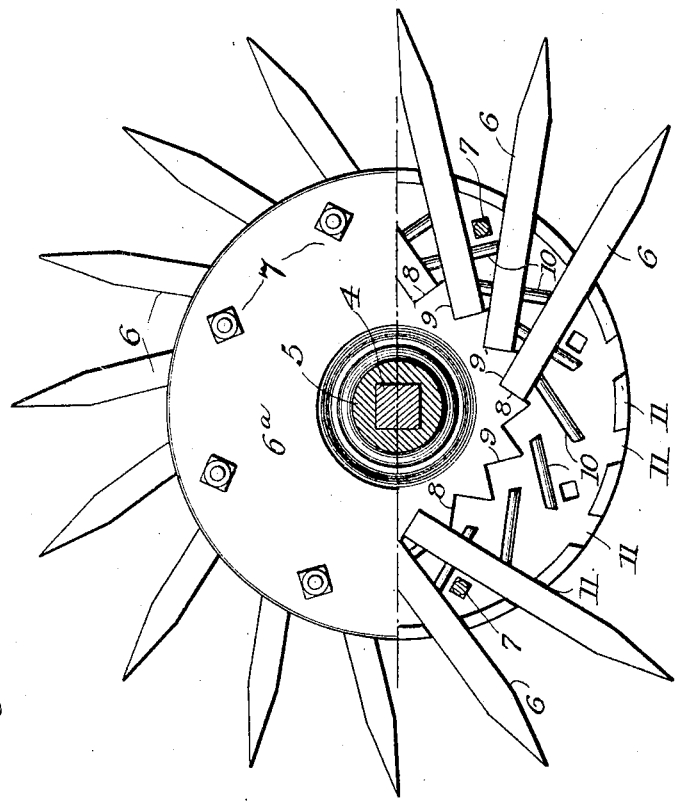
Witnesses
N. F. Barnes.
L. E. Morrison
Inventor
A. C. Lindgren
By P. T. Dodge Attorney

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

AGRICULTURAL IMPLEMENT.

No. 925,926. Specification of Letters Patent. Patented June 22, 1909.

Application filed April 18, 1908. Serial No. 427,954.

*To all whom it may concern:*

Be it known that I, ALEXUS C. LINDGREN, of Moline, county of Rock Island, and State of Illinois, have invented a new and useful Improvement in Agricultural Implements, of which the following is a specification.

This invention relates to cultivators designed more particularly for the renovation and cultivation of the alfalfa plant. In machines for this purpose a gang or gangs of rotary toothed disks or heads are sustained by a draft frame in such manner that when drawn over the field the disks will be caused to rotate with a rolling action as their teeth enter the ground by which means the soil will be dug and stirred up. In the renovation of the alfalfa plant it is the aim not only to agitate and cultivate the soil around the plant, but also to cut or split the crown of the plant vertically to cause new growths.

My invention is directed to the form and construction of the individual disks or heads, the aim being to provide a construction in which the teeth will enter the ground readily and deeply, split the crown of the plant and effectually cultivate the ground adjacent the same.

The invention consists of a digger head comprising a head or hub proper and a series of digger teeth straight from end to end attached to the head tangentially with reference to its axis of rotation, so that when the digger heads are drawn in gang over the field in the direction in which the teeth contacting with the ground point, the teeth will enter the ground readily and in line with their longitudinal axes.

The invention consists also in the improved form and construction of the head by which the individual teeth are held firmly and securely in position.

In the accompanying drawings:—Figure 1 is a side elevation of one of my improved digger heads, showing the same mounted in a suitable draft-frame as one of a gang, by which frame the heads are drawn over the ground. Fig. 2 is a vertical section through the same. Fig. 3 is a plan view of the inner face of the hub in which the teeth are secured at their inner ends, a number of the teeth being removed to expose other parts to view. Fig. 4 is an elevation of the digger head as viewed from the side opposite to that shown in Fig. 1. Fig. 5 is a perspective view of one of the teeth removed.

Referring to the drawings:—The digger heads 1 are designed as usual to be assembled side by side in gangs so as to rotate together, which gangs may be sustained in any appropriate manner in a suitable draft frame 2; which is shown as being provided with a depending standard 3 supporting at its lower end a rotary squared shaft 4 on which the heads are mounted and separated by spools 5, there being of course a number of these standards so as to give proper support to the shaft. It is usual in this class of machines to arrange the gangs end to end and to provide means by which their angle or obliquity with reference to the line of draft may be varied; but as these features of construction and arrangement do not in themselves constitute any part of my invention, such details have not been illustrated, but only the specific form of the head to which my invention is directed.

The digger head comprises a body or hub 5ª, to which is firmly secured a number of digger teeth 6, which teeth are straight from end to end, their outer ends projecting beyond the edge of the hub and their inner portions being firmly fastened to the hub in the manner presently to be described in such position that the teeth will stand or will extend tangentially with reference to the axis of rotation, that is to say, they are so arranged that a line drawn longitudinally through a tooth will, if extended toward the center of the disk, pass to one side of said center and will not cut the axis of rotation as it would if the teeth were arranged radially with reference to said axis. The purpose of this construction, that is the disposition of the teeth tangentially, is to facilitate their penetration in the ground as the digger heads are drawn thereover by the draft frame, the direction of travel of the frame being as indicated by the arrow in Fig. 1 corresponding to that in which the teeth contacting with the surface of the soil point. As a result, the forward pull on the frame will draw the teeth endwise into the ground, so that their penetration will be deeper and they will effectively cut through the tough crowns of the plant and are better adapted to penetrate and dig up hard and dry soil.

As shown particularly in Figs. 2 to 4, the teeth are square in cross-section, straight from end to end and pointed sharply at their outer active ends. They lie flatly against the inner face of the hub 5ᵃ and are confined against lateral escape by means of a confining plate 6ᵃ fastened firmly in place by means of a number of bolts 7, extending through the hub between the teeth and through holes in the confining plate and having nuts applied thereto. The hub 5ᵃ contains a squared central opening to receive the squared shaft, while the confining plate has a central opening encircling the spacing spool by which the digger heads are spaced on the shaft.

In order that the teeth may be given firm support in the head or hub and prevented from moving laterally and escaping endwise, the hub is formed adjacent its center with a number of inclined shoulders 8 and 9, forming between them angles in which the ends of the teeth are seated, the shoulder 8 affording an abutment or bearing for the end of the tooth, while the shoulder 9 forms a bearing or abutment for the side of the tooth adjacent its end, each tooth thus being given, by the series of shoulders, firm and rigid support both at its end and side. Beyond these shoulders the hub has projecting from it a number of ribs 10 disposed tangentially and overlapping at their ends, each of which ribs extends in a groove formed transversely in the face of the teeth, so that the teeth are interlocked respectively with these ribs and thereby effectually prevented from movement endwise. The length, disposition and relative arrangement of the ribs and teeth are such that each rib at its opposite ends forms an abutment for and bears against the sides of the two teeth immediately adjoining the interlocked tooth, so that every rib is interlocked with one tooth and affords a lateral bearing for two teeth, and by the provision of these ribs each tooth is given a bearing on one side at a point beyond the bearing formed by the shoulder 9. Beyond these points of lateral support formed by the ribs 10, the teeth are each given further lateral support on opposite sides at the edge of the hub, which latter is for this purpose formed with an inwardly extending annular flange recessed as at 11 to receive the respective teeth.

From the construction described, it will be seen that the teeth are held flatly against the inner face of the hub 5 by means of the confining plate and are therefore by this means held firmly interlocked each with its rib 10, so that by these means the teeth are prevented from escaping endwise from between the confining plate and hub. It is also seen that by means of the inclined shoulders 8 and 9, the ribs 10, and the recesses or sockets 11, the teeth are afforded lateral supports at their inner ends, at the edge of the hub and at an intermediate point, so that they are held rigidly and firmly in position, while at the same time they may by the removal of the confining plate, be independently detached and replaced by a new one in case of wear or injury.

I am aware that it is not new in a broad sense to attach digger teeth to their supporting head so that their active projecting ends will extend tangentially with reference to the axis of rotation. In such cases it has been the practice to bend the teeth where they extend beyond the supporting head so that their projecting portions only extend tangentially. My construction is to be distinguished from this in the respect that my digger teeth are straight throughout their length from end to end, and they bear throughout their entire length a tangential relation to the axis of rotation. This is advantageous in that the teeth when free from bends possess greater strength, require less time in production, and may be made at less cost.

In order that any trash or weeds gathered by the digger-heads in their rotation may be dislodged, I provide for each digger-head a scraper bar 12 fixed at its upper end to the frame and extending rearwardly and then forwardly and downwardly along the side of the head with its end encircling and engaged in an annular recess 12ᵃ formed in the hub. By the engagement of the end of the bar in the recess, the former is maintained in position and prevented from moving out of place laterally. By this arrangement of the parts, the scraper bars are entirely independent of the spools by reason of the fact that, at the lower ends, the bars embrace the hubs at a point somewhat removed from the ends of the hubs and are held against lateral movement thereon, so that they are thus maintained constantly in the same operative relation to the heads, and in the event of any lateral displacement of a spool, such displacement will in no way effect or permit displacement of a scraper bar. In the action of the scraper bars, the trash as it is brought around by the head will be carried against the rearwardly and upwardly inclined portion of the bar and by it freed from the head.

Having described my invention, what I claim and desire to secure by Letters Patent is:—

1. In a digger-head, the combination with a hub member, of a series of digger-teeth formed each with a laterally extending groove, a series of ribs on the hub member adapted to enter respectively the grooves in the teeth, a series of shoulders on the hub member against which the ends of the teeth are adapted respectively to bear, and a flange on the hub member formed with notches in which the teeth are adapted respectively to snugly fit.

2. In a digger head, the combination with a hub-member, of a series of digger teeth, and a series of ribs on the hub-member, each with its ends disposed to form side abutments for two alternate teeth, and means for holding the teeth in place on the hub-member.

3. In a digger head, the combination with a hub-member, of a series of digger teeth, and a series of ribs on the hub member, each rib interlocked with one tooth to prevent endwise movement, and bearing at its ends against the sides of the two adjacent teeth, and means for holding the teeth interlocked with the ribs.

4. In a digger head, the combination of a hub-member, a series of transverse ribs on the face of said member overlapped at their ends, and a series of teeth, each with a transverse groove to receive a rib and seated against the end of the adjacent rib, and means for holding the teeth interlocked with the ribs.

5. In a digger head, the combination of a hub-member, a laterally extending annular flange on the edge thereof provided at intervals with notches, a series of angularly related shoulders on the face of the hub-member adjacent its center, the face of the hub member between said shoulders and the annular flange being flat, and a series of digger teeth fitting snugly in said notches and seated flatly against the face of the hub-member with their inner ends fitting in the angles between the shoulders, and means for retaining said teeth in place on the hub-member.

6. In combination with the frame and rotating digger-heads mounted therein, of an axial support on which said heads are mounted, hubs on the heads, spacing spools sustained by the axial support and engaging at their ends against the ends of the hubs, a series of scraper bars fixed at their upper ends to the frame and extending downwardly alongside the respective heads and having their lower ends embracing the hubs of the heads, and means for retaining the scraper bars in fixed spaced relation to the heads, whereby operative relation of the scraper bars to the heads is maintained irrespective of the position of the spools.

7. In combination with the frame and rotating digger-heads mounted therein, of an axial support on which said heads are mounted, hubs on the heads, the hubs being provided with grooves, spacing spools sustained by the axial support and engaging at their ends against the ends of the hubs, and a series of scraper bars fixed at their upper ends to the frame and extending downwardly alongside the respective heads and having their lower ends engaging in the grooves in the hubs, whereby operative relation of the scraper bars to the heads is maintained irrespective of the position of the spools.

In testimony whereof I hereunto set my hand this tenth day of April, 1908, in the presence of two attesting witnesses.

ALEXUS C. LINDGREN.

Witnesses:
  L. C. BLANDING,
  C. A. BANISTER.